UNITED STATES PATENT OFFICE.

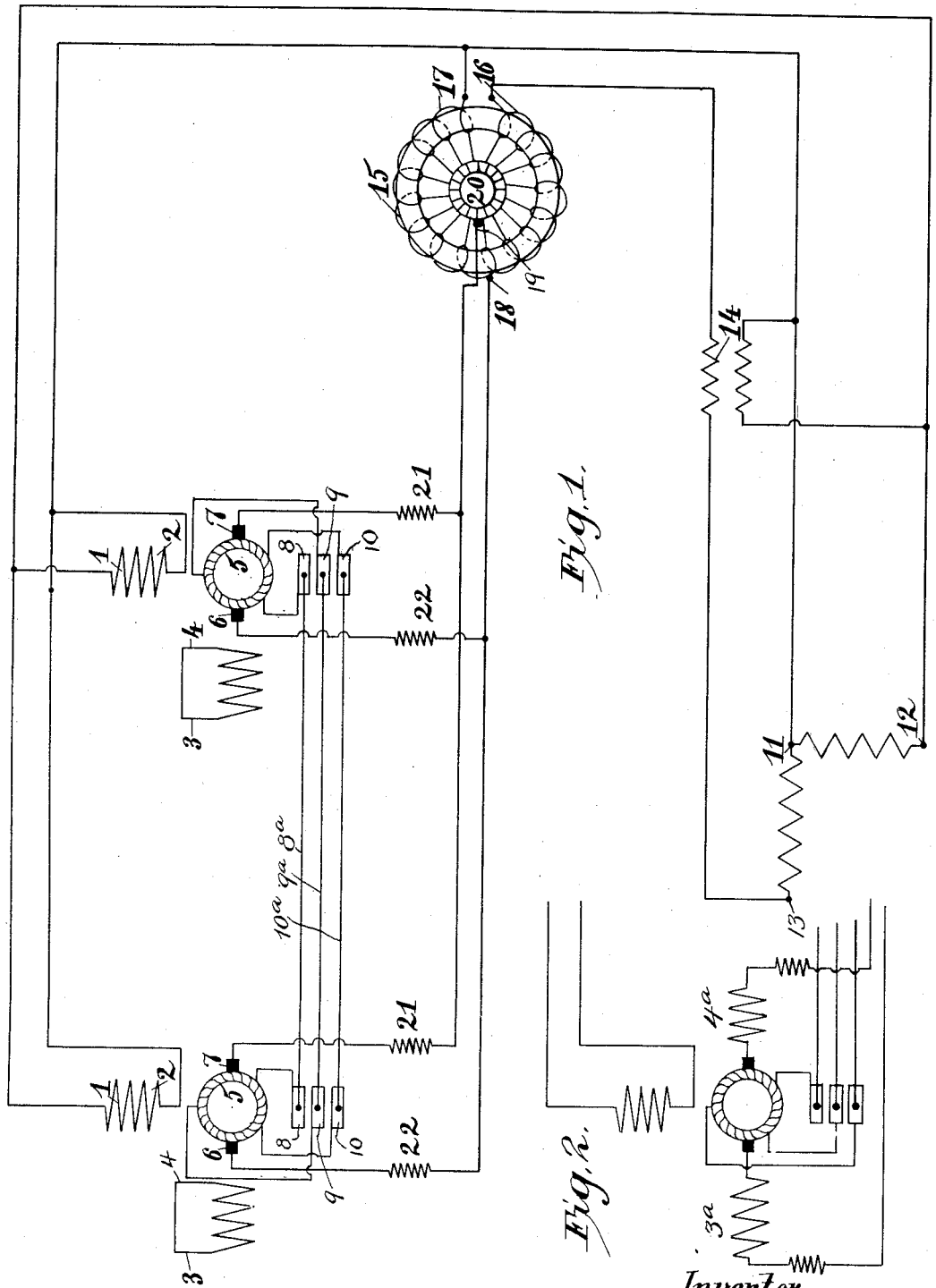

JOSEPH LOUIS ROUTIN, OF PARIS, FRANCE.

MEANS FOR COLLECTIVELY ACTUATING AND CONTROLLING ALTERNATING-CURRENT MOTORS.

1,221,095. Specification of Letters Patent. Patented Apr. 3, 1917.

Application filed March 26, 1915. Serial No. 17,164.

*To all whom it may concern:*

Be it known that I, JOSEPH LOUIS ROUTIN, a citizen of the French Republic, residing at Paris, in France, have invented certain new and useful Improvements in Means for Collectively Actuating and Controlling Alternating-Current Motors, of which the following is a specification.

In my Patent No. 1090568 I have described means for collectively actuating and controlling alternating current commutator motors.

The object of the invention is to provide means for maintaining the synchronism between the receivers even when they operate in synchronism with an alternator, to render the speed of the receivers practically independent of the resistant couple, to allow for slight differences of construction between the receivers and also to provide an increase in the value of the synchronizing couple.

In the annexed drawing, Figure 1 shows an installation comprising two receivers only. Fig. 2 illustrates a modification in the construction of the motors.

Each receiver shown in Fig. 1 comprises a stator of a polyphase motor assumed to be bi-polar, and diagrammatically illustrated by the coils 1, 2 and 3, 4 arranged at an angle of 90° to one another, and a rotor 5 wound like the armature of a continuous current machine.

The brushes 6, 7 which bear on the commutator of the rotor are disposed in the axis of the coil 3, 4, which is short circuited upon itself; self induction of the armature is thus reduced to a very feeble value.

The rotor also carries three slip rings 8, 9, 10 connected to three equidistant points of its coil.

As shown in the drawing the coils 1, 2 are constantly connected in parallel as also are the brushes 6, 7; brushes which bear on the rings 8, 9, 10 are connected to each other by wires 8ª, 9ª, and 10ª.

The coils 1, 2 are fed under constant pressure by the phase winding 11, 12 of a bi-phased alternator.

The rotors are on the other hand fed by the second phase winding 11—13 of the said alternator.

A small phase transformer 14 is arranged which allows of regulating the relation of the phase of the voltage supplied to the armature brushes 6, 7 with respect to the phase of the voltage supplied to the field coils 1, 2 so as to reduce the current consumed by the armature to the minimum. The primary coil of this transformer is in parallel with the phase winding 11—12, and the secondary coil is in series with the phase winding 11—13. The effective voltage in the circuit of the winding 11—13 accordingly has two components, one due to the winding itself, and the other due to the transformer, the latter component being substantially in phase with the voltage of the winding 11—12. The phase difference between this resultant voltage and the voltage of the winding 11—12 is, therefore, dependent on the number of ampere turns in the transformer. In practice the most suitable phase difference is about 80°.

For regulating the value and altering the direction of the current supplied to the rotors 5 I use an auto-transformer, whose coil 15 is wound upon an iron ring. The terminals 16 and 17 of this coil are connected to the phase winding 13, 11 and the secondary circuit has a fixed terminal 18 upon the coil and an adjustable terminal 19 upon a ring of insulated segments 20 connected by tapping wires to the coil.

In practice there are always certain differences between the receivers and it may happen that the two rotors, with their connections to the slip rings 8, 9, 10, are not exactly in the same position relatively to the brushes 6, 7. In this case a portion of one rotor coil will tend to send current over two connected slip rings to the other rotor coil, and back through part of the external circuit. To reduce such currents to a negligible value I insert resistances 21, 22 in the wires leading to the brushes 6, 7.

In the modification shown in Fig. 2 I use for neutralizing the armature induction, instead of the coil 3, 4 two symmetrical coils 3ª and 4ª, one at each side of the rotor.

What I claim as my invention and desire to secure by Letters Patent of the United States is:—

1. In combination a plurality of alternating current commutator motors, each having a rotor winding and a plurality of slip rings severally connected to equidistant parts of said winding, and each having two stator coils, one for neutralizing armature induction and one for driving the rotor means electrically connecting the slip rings of the several motors, means for feeding current at variable pressure to the several rotors in parallel, said feeding means including resistances in series with the rotors, and means for feeding current at constant pressure, not in phase with the voltage of the first mentioned current, to the driving stator coils.

2. In combination a plurality of alternating current commutator motors, each having a rotor winding and a plurality of slip rings severally connected to equidistant parts of said winding, and each having two stator coils, one for neutralizing armature induction and one for driving the rotor, means for electrically connecting the slip rings of the several motors, a two phase current generator, means electrically connecting in parallel the driving stator coils to one phase winding of said generator, means including resistances electrically connecting in parallel the said rotors to the other phase winding of said generator, and means for varying the pressure of the current fed to said rotors from the second mentioned phase winding.

3. In combination a plurality of alternating current commutator motors, each having a rotor winding and a plurality of slip rings severally connected to equidistant parts of said winding, and each having two stator coils, one for neutralizing armature induction and one for driving the rotor, means electrically connecting the slip rings of the several motors, a two phase current generator, means electrically connecting in parallel the driving stator coils to one phase winding of said generator, means including resistances electrically connecting in parallel the said rotors to the other phase winding of said generator, means for varying the pressure of the current fed to said rotors from the second mentioned phase winding, and a phase transformer for altering the phase difference of the currents supplied by said phase windings.

In witness whereof I have signed this specification in the presence of two witnesses.

JOSEPH LOUIS ROUTIN.

Witnesses:
De Witt C. Poole, Jr.,
Emile Bertrand.